US010997018B2

(12) United States Patent
Lu et al.

(10) Patent No.: US 10,997,018 B2
(45) Date of Patent: May 4, 2021

(54) CONSENUS OF SHARED BLOCKCHAIN DATA STORAGE BASED ON ERROR CORRECTION CODE

(71) Applicant: ALIPAY (HANGZHOU) INFORMATION TECHNOLOGY CO., LTD., Zhejiang (CN)

(72) Inventors: Zhonghao Lu, Hangzhou (CN); Haizhen Zhuo, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/085,518

(22) Filed: Oct. 30, 2020

(65) Prior Publication Data
US 2021/0049065 A1 Feb. 18, 2021

Related U.S. Application Data

(63) Continuation of application No. PCT/CN2019/115892, filed on Nov. 6, 2019.

(51) Int. Cl.
*G06F 11/10* (2006.01)
*H04L 9/32* (2006.01)

(52) U.S. Cl.
CPC ........ *G06F 11/1004* (2013.01); *H04L 9/3236* (2013.01); *H04L 9/3247* (2013.01); *H04L 2209/34* (2013.01); *H04L 2209/38* (2013.01)

(58) Field of Classification Search
CPC ............... G06F 11/10; H04L 2209/38; H04L 2209/34; H04L 9/3247; H04L 9/3236
(Continued)

(56) References Cited

U.S. PATENT DOCUMENTS

| 6,674,874 | B1* | 1/2004 | Yoshida | G06T 1/0085 |
| | | | | 380/205 |
| 10,579,586 | B1* | 3/2020 | Golpayegani | G06F 16/122 |
| 2003/0154194 | A1* | 8/2003 | Jonas | G06F 16/254 |
| 2007/0143353 | A1* | 6/2007 | Chen | G06F 12/0292 |

(Continued)

FOREIGN PATENT DOCUMENTS

| CN | 107181599 | 9/2017 |
| CN | 108694665 | 10/2018 |

(Continued)

OTHER PUBLICATIONS

Perard, Doriane, et al. "Erasure code-based low storage blockchain node." 2018 IEEE International Conference on Internet of Things (iThings) and IEEE Green Computing and Communications (GreenCom) and IEEE Cyber, Physical and Social Computing (CPSCom) and IEEE Smart Data (SmartData). IEEE, 2018. (Year: 2018).*

(Continued)

*Primary Examiner* — Syed A Zaidi
(74) *Attorney, Agent, or Firm* — Fish & Richardson P.C.

(57) ABSTRACT

A computer-implemented method includes: retrieving a plurality of blocks from a blockchain node of a blockchain network. The plurality of blocks are encoded using error correction coding (ECC) as encoded blocks. For each encoded block: The encoded block is divided into a plurality of datasets. Hash values of the plurality of datasets are calculated. A request that includes at least one of the plurality of datasets, the hash values, and a data storage scheme that provides assignments of the plurality of datasets to the plurality of blockchain nodes is sent to each of the plurality of blockchain nodes of the blockchain network. Responses for accepting the request is received from at least a number of blockchain nodes that equals a number of the one or more datasets of information bits. Each of the (Continued)

plurality of blockchain nodes is sent a notification for adopting the data storage scheme.

27 Claims, 10 Drawing Sheets

(58) Field of Classification Search
USPC ......................................................... 714/758
See application file for complete search history.

(56) References Cited

U.S. PATENT DOCUMENTS

| | | | |
|---|---|---|---|
| 2007/0294422 A1* | 12/2007 | Zuckerman | H04L 67/104 709/230 |
| 2009/0150605 A1* | 6/2009 | Flynn | H05K 7/1444 711/112 |
| 2010/0205508 A1* | 8/2010 | Mesonzhnik | G11B 20/1803 714/763 |
| 2011/0055178 A1* | 3/2011 | Mark | G06F 3/0622 707/697 |
| 2019/0066228 A1 | 2/2019 | Wright | |
| 2019/0311392 A1 | 10/2019 | Swamidurai | |
| 2019/0327080 A1 | 10/2019 | Liu et al. | |

FOREIGN PATENT DOCUMENTS

| | | |
|---|---|---|
| CN | 109491968 | 3/2019 |
| CN | 109871366 | 6/2019 |
| KR | 20140092925 | 7/2014 |
| KR | 20190094399 | 8/2019 |
| KR | 20190098752 | 8/2019 |
| KR | 20190104793 | 9/2019 |
| TW | 201911099 | 3/2019 |

OTHER PUBLICATIONS

NPL Search Terms (Year: 2020).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/115892, dated Aug. 12, 2020, 7 pages.
EP Extended Search Report in European Application No. 19850274. 2, dated Mar. 15, 2021, 8 pages.

* cited by examiner

US 10,997,018 B2

CONSENSUS OF SHARED BLOCKCHAIN DATA STORAGE BASED ON ERROR CORRECTION CODE

CROSS-REFERENCE TO RELATED APPLICATIONS

This application is a continuation of PCT Application No. PCT/CN2019/115892, filed on Nov. 6, 2019, which is hereby incorporated by reference in its entirety.

TECHNICAL FIELD

This specification relates to consensus of shared storage of blockchain data based on error correction code.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain-based programs can be executed by a distributed computing platform. For example, the distributed computing platform can include a virtual machine that provides the runtime environment for executing smart contracts. A blockchain computing platform can be viewed as a transaction-based state machine. State data in the platform can be assembled to a global shared-state referred to as a world state. The world state includes a mapping between account addresses and account states. The world state can be stored in data structures such as the Merkle Patricia tree (MPT).

Besides state data, blockchain networks can also store other types of data such as block data and index data. Block data can include block header and block body. The block header can include identity information of a particular block and the block body can include transactions that are confirmed with the block. As transactions are increasingly entered into the blockchain, state data and block data can grow very large in size. In some DLSs, every node stores an entire copy of the blockchain, which can take large amount of storage space. This is because all block data and state data are stored going back to the first transaction recorded to the blockchain. In some DLSs, a few shared nodes store the entire copy of the blockchain and share blockchain data with other blockchain nodes which can create "data inequality." That is, when data are unevenly distributed across different nodes, the risk of data security can be high when nodes that store majority of data are at fault.

Accordingly, it would be desirable to enable a data storage scheme that maintains data equality and integrity while tolerating the existence of faulty nodes. It would also be desirable for the data storage scheme to be adjustable to changes made to the blockchain network and indicative of data processing manners that can result in maximal storage savings.

SUMMARY

Described embodiments of the subject matter can include one or more features, alone or in combination.

For example, in one embodiment, a computer-implemented method for processing blockchain data in a trusted execution environment (TEE) performed by a computing device is disclosed. The computing device retrieves a plurality of blocks from a blockchain node of the blockchain network, encode the plurality of blocks using error correction coding (ECC) to generate a plurality of encoded blocks. For each encoded block in the plurality of encoded blocks, the computing device divides the encoded block into a plurality of datasets, wherein the plurality of datasets include one or more datasets of information bits and one or more datasets of redundant bits, calculates hash values of the plurality of datasets, sends, to each of a plurality of blockchain nodes of the blockchain network, a request that includes at least one of the plurality of datasets, the hash values, and a data storage scheme that provides assignments of the plurality of datasets to the plurality of blockchain nodes, receives responses for accepting the request from at least a number of blockchain nodes that equals a number of the one or more datasets of information bits, and sends, to each of the plurality of blockchain nodes, a notification for adopting the data storage scheme.

In some embodiments, these general and specific aspects may be implemented using a system, a method, or a computer program, or any combination of systems, methods, and computer programs. The foregoing and other described embodiments can each, optionally, include one or more of the following features:

In some embodiments, the adopting the data storage scheme further includes: storing at least one of the plurality of datasets based on the assignments provided in the data storage scheme; and deleting existing blockchain data associated with the plurality of blocks.

In some embodiments, a number of the plurality of datasets equals a number of blockchain nodes of the blockchain network and a code rate of the plurality of encoded blocks equals a minimum number of honest blockchain nodes required by the blockchain network divided by a total number of blockchain nodes.

In some embodiments, the computing device retrieves the plurality of blocks in response to a blockchain node dropping out from the blockchain network.

In some embodiments, for each block of the plurality of blocks after the blockchain node drops out, the computing device further determines a first number of blockchain nodes that stores at least a portion of an ECC encoded version of the block and a second number of blockchain nodes that store at least a portion of redundant bits of the ECC encoded version of the block, a total number of blockchain nodes of the blockchain network and a maximum number of faulty blockchain nodes tolerable by the blockchain network, and whether a first difference between the first number and the second number is less than or equal to a second difference between the total number and the maximum number.

In some embodiments, the computing device encodes the plurality of blocks in response to determining that the first difference is greater than the second difference.

In some embodiments, the ECC is performed when utilization rate of computational resource of the computing device is less than or equal to a predetermined value.

In some embodiments, the ECC is erasure coding performed by adding redundant bits to the plurality of blocks.

In some embodiments, the minimum number of honest blockchain nodes required is determined based on a practical Byzantine fault tolerance (PBFT) consensus protocol.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
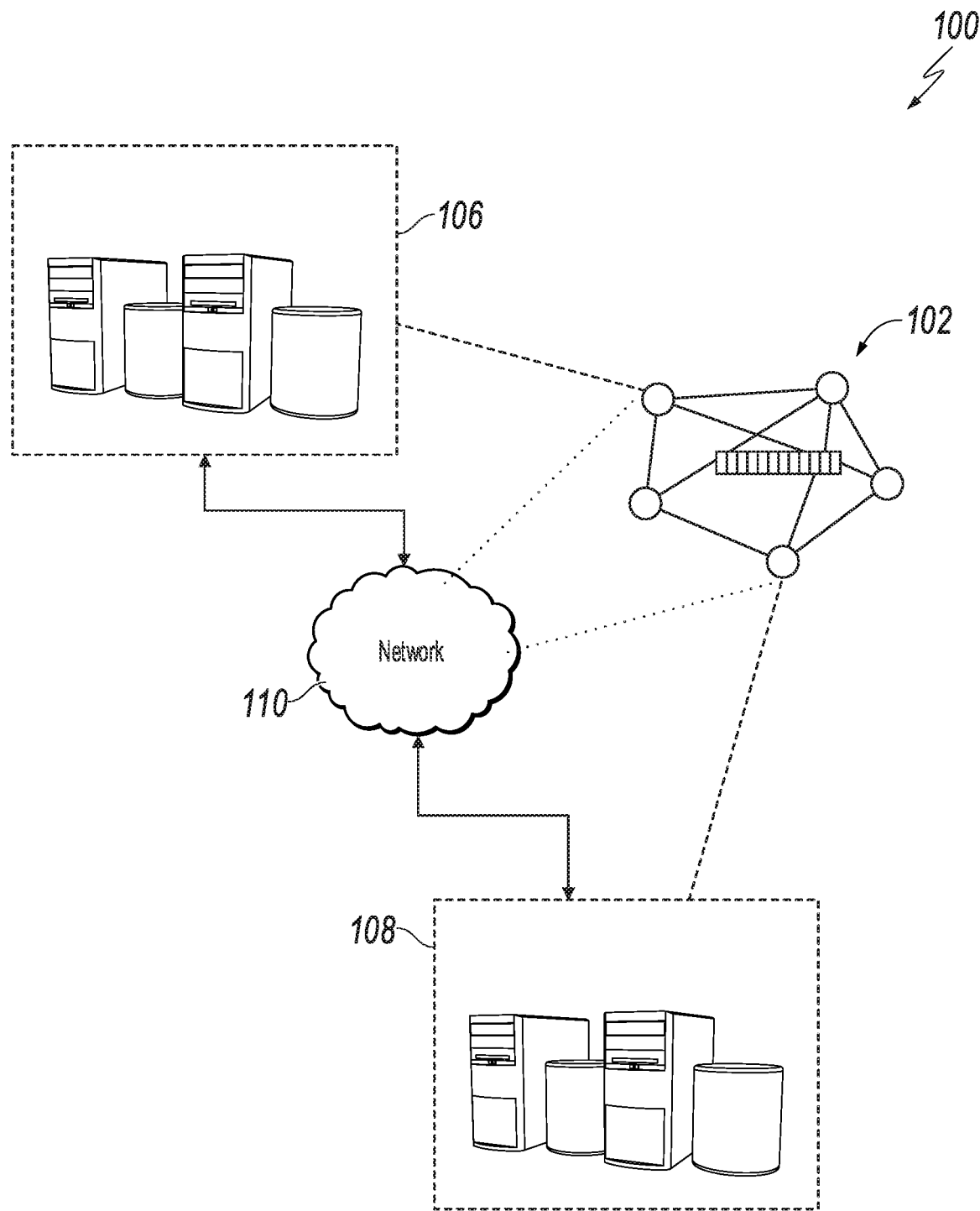
FIG. 1 depicts an example of an environment that can be used to execute embodiments of this specification.

This specification describes technologies for processing blockchain data in a trusted execution environment (TEE). These technologies generally involve retrieving a plurality of blocks from a blockchain node of the blockchain network, encoding the plurality of blocks using error correction coding (ECC) to generate a plurality of encoded blocks, and for each encoded block in the plurality of encoded blocks: dividing the encoded block into a plurality of datasets, calculating hash values of the plurality of datasets, sending, to each of a plurality of blockchain nodes of the blockchain network, a request that includes at least one of the plurality of datasets, the hash values, and a data storage scheme that provides assignments of the plurality of datasets to the plurality of blockchain nodes, receiving responses for accepting the request from at least a number of blockchain nodes that equals a number of the one or more datasets of information bits, and sending, to each of the plurality of blockchain nodes, a notification for adopting the data storage scheme.

As described herein, blockchain networks can store different types of data such as state data, block data, and index data. Block data includes all transactions in the blockchain network, which can take a large amount of storage space as new blocks are constantly adding to the blockchain. It can be inefficient for the blockchain nodes to each store all the block data, especially for data of infrequently accessed blocks (e.g., blocks added to the blockchain long time ago). Accordingly, embodiments of this specification provide that each blockchain node stores a portion of infrequently accessed blocks and retrieves the rest of the block data from other blockchain nodes when needed, to reduce storage consumption. However, if faulty nodes or unreliable nodes exist in the blockchain network, the retrieved data cannot be trusted and data loss may occur.

In some embodiments, the blockchain nodes can perform ECC such as erasure coding to encode the infrequently accessed blocks. The ECC encoded blocks can then be divided into a plurality of datasets. The plurality of datasets can be indexed and assigned to different blockchain nodes to store based on a data storage scheme. When data from an infrequently accessed block is needed by a blockchain node to execute a smart contract, the blockchain node can retrieve corresponding datasets from other blockchain nodes based on the index to form the ECC encoded block and recover the original block. By sharing ECC encoded blocks, even if unauthentic data exists or data loss occurs, the original block data can be recovered as long as the percentage of honest blockchain nodes is greater than or equal to the code rate of the ECC.

In some embodiments, instead of performing ECC on each blockchain node, the ECC can be performed under a TEE associated with a trusted node. By using the TEE technology, the trusted node can generate verifiable encoded blocks, divide the encoded blocks to datasets, and send the datasets and a data storage scheme to each blockchain node for storage. The datasets generated under TEE can be verifiable by the blockchain nodes. Each blockchain node can then store a portion of the datasets based on the data storage scheme to save on storage space. By having a TEE enabled trusted node, the ECC only needs to be performed once, instead of separately performed by each blockchain node. As such, the overall computing resource consumption of the blockchain network can be significantly reduced.

In some embodiments, new blockchain nodes are added as full nodes to a blockchain network. The newly added full nodes store additional copies of blocks that are not shared by other nodes. The additional copies of blocks can add redundancy to the blockchain network in terms of storage. The trusted node can reperform ECC to the blocks with copies stored in the full nodes and send datasets divided from the ECC encoded blocks to the blockchain nodes to replace the original blockchain data. Because the number of redundant copies may be different for different blocks, reperforming ECC (re-ECC) can result in different storage savings. Therefore, a re-ECC priority can be determined for each block based on its redundancy, such that the re-ECC operation can be performed to blocks with higher re-ECC priority to achieve larger storage savings.

In some embodiments, when blockchain nodes are deleted from a blockchain network. The trusted node can reperform the ECC such that the percentage of honest blockchain nodes can be greater than or equal to the code rate of the ECC to ensure data security. The embodiments of this specification provide methods to determine a maximum code rate that can be adopted to safely re-ECC.

After re-ECC is performed, the trusted node can initiate a consensus process with the blockchain nodes to reach an agreement on the new data storage scheme based on the re-ECC. After a consensus is reached, the blockchain nodes can safely remove the original data and follow the new data storage scheme for blockchain data storage and recovery.

The techniques described in this specification produce several technical effects. For example, embodiments of the subject matter reduce the burden on storage resources of blockchain networks, while maintaining computational efficiency and data equality of the blockchain nodes. For infrequently accessed blocks (e.g., older blocks), storage resources of blockchain nodes can be conserved by saving only a portion of ECC encoded blocks (also referred to herein as encoded blocks) on each blockchain node and retrieving the remainder of the encoded blocks from other blockchain nodes when needed.

In some embodiments, new blockchain nodes are added as full nodes to a blockchain network. The newly added full nodes store additional copies of blocks that are not shared by other nodes. The additional copies of blocks add redundancy to the blockchain network in terms of storage. Embodiments of this specification provides techniques to re-ECC of the blocks and sharing datasets divided from the ECC encoded blocks with other blockchain nodes to reduce storage consumption. The techniques are especially suitable for blockchain networks with limited storage resources. The ECC can also be reperformed by the blockchain node when the CPU usage is low so as better utilize the computational resources.

In some embodiments, by performing ECC in a TEE associated with a trusted node, the trusted node can generate encoded blocks, divide the encoded blocks to datasets, and send the datasets and a data storage scheme to each blockchain node for storage. The datasets generated under TEE can be verifiable by the blockchain nodes to ensure data authenticity. Each blockchain node can then store a portion of the datasets based on the data storage scheme instead of the entire block to save on storage space. By having a TEE enabled trusted node, the ECC needs to be performed only once, instead of separately performed by each blockchain node. As such, the overall computing resource consumption of the blockchain network can be reduced.

In some embodiments, ECC can be reperformed after full blockchain nodes are added to the blockchain network. The ECC can be performed with a higher code rate based on the maximum number of faulty blockchain nodes tolerable by the blockchain network to improve storage efficiency. However, re-ECC to every block of the blockchain can consume large amount of computational resources, a re-ECC priority can be determined for each block based on storage savings of the re-ECC. As such, re-ECC can be prioritized to blocks with higher re-ECC priority to achieve greater storage savings while keeping the computational resource consumption low.

In some embodiments, blockchain nodes may be deleted from a blockchain network. The ECC may be reperformed such that the percentage of honest blockchain nodes can still be greater than or equal to the code rate of the ECC to ensure data security. The embodiments of this specification provide methods to determine a code rate that can be safely adopted for re-ECC and efficient processes to reach consensus of efficient blockchain data storage.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium often (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
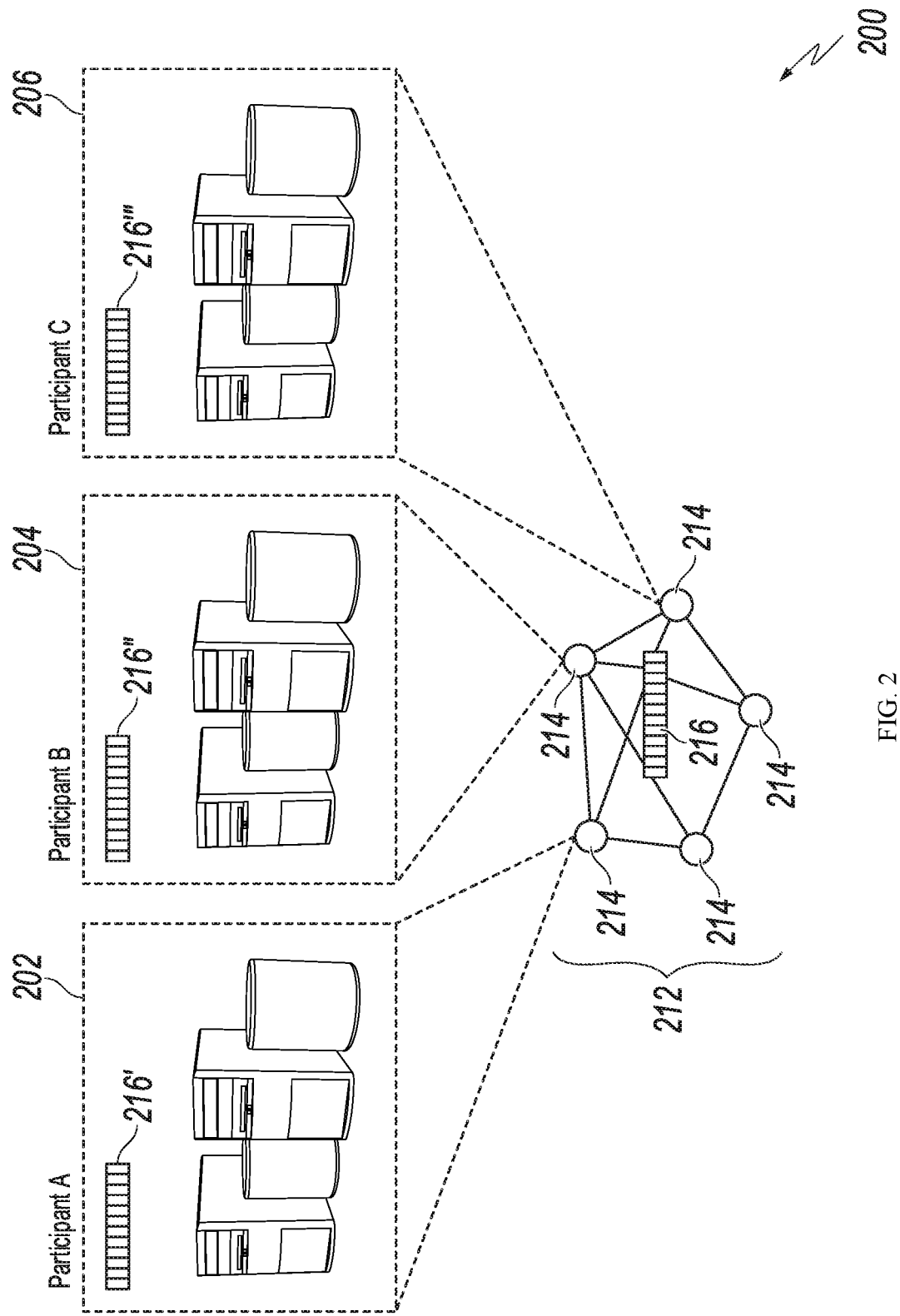
FIG. 2 depicts an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. In PBFT, the maximum number of faulty consensus nodes needs to be less than ⅓ of the total number of consensus nodes. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network, can operate using TEE. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing unit (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (e.g., the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients.

Figure 3:
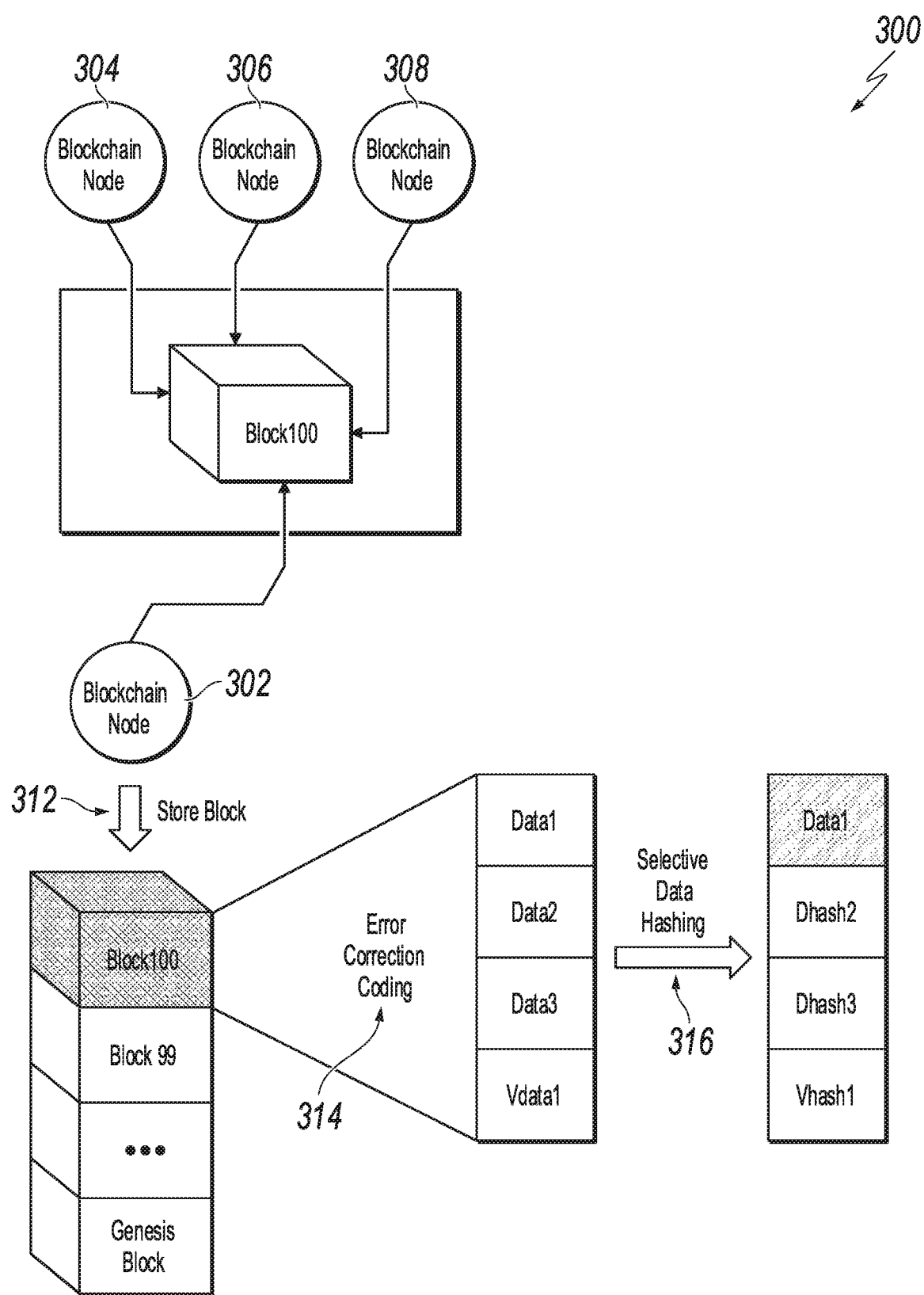
FIG. 3 depicts an example of a block data encoding and hashing process in accordance with embodiments of this specification.

FIG. 3 depicts an example of a block data encoding and hashing process 300 in accordance with embodiments of this specification. In this example, a blockchain network of four blockchain nodes is depicted, which are blockchain nodes 302, 304, 306, and 308. Using blockchain node 302 as an example to illustrate the encoding and hashing process 300, the blockchain node 302 can store block data of the blockchain network to block body of a block 312. In the illustrated example, the block data is stored in block 100. Afterwards, the blockchain node 302 can engage in a consensus process with other blockchain nodes 304, 306, and 308. During the consensus process, the blockchain node 302 can perform a consensus algorithm, such as proof of work (PoW) or proof of stake (PoS) to create a corresponding block on the blockchain.

In some embodiments, the blockchain node 302 can identify one or more infrequently accessed blocks. In practice, the longer a block has been created, the less likely the corresponding block data is needed for operations such as executing smart contracts. The blockchain node 302 can determine that locally stored blocks are infrequently accessed when they are historical blocks that have been created on the blockchain for a predetermined amount of time. For example, the predetermined amount of time can be one or two times of the average time a block is created. In some examples, a block can also be determined as infrequently accessed when no block data in the block is retrieved for the predetermined amount of time to execute smart contracts.

After identifying infrequently accessed blocks, the blockchain node 302 can perform ECC 314 of block data in the block body of each of the infrequently accessed blocks. ECC can be used for controlling errors or losses of data over unreliable transmissions by adding redundant bits (also referred to as redundancy) to the data. Redundant bits can be a complex function of many original information bits. The redundancy can allow errors or losses of data to be corrected without retransmission of the data. The original information may or may not appear literally in the encoded output. ECC codes that include the unmodified original information in the encoded output are referred to as systematic ECC codes, while those that do not are referred to as non-systematic ECC codes. The maximum fractions of errors or of missing bits that can be corrected by ECC is determined by the design of the ECC code. Therefore, different error correction codes are suitable for different conditions. In general, a stronger ECC code induces more redundancy, which increases storage consumption of the code and reduces communication efficiency if the encoded information is to be transmitted.

One example ECC can be the erasure coding. Using the erasure coding, a message of k symbols can be encoded to a codeword with n symbols, where k and n are natural numbers, and k<n. The message can be recovered from a subset of the n-symbol codeword. The fraction $r=k/n$ is the code rate of the erasure code.

By using ECC, each of the blockchain nodes can store a portion of the encoded block data and retrieve the rest of the encoded block data from other blockchain nodes when needed. In some embodiments, the ECC can be performed when utilization rate of computational resource of the blockchain node 302 is lower than a predetermined value (e.g., 40%). As such, the interference with other computational operations on the blockchain node 302 can be reduced. In some embodiments, ECC can be performed when the usage of storage space of the blockchain node 302 is greater than or equal to a predetermined percentage, such that after ECC, some portions of the encoded block data can be deleted to free up storage space.

Again, using block 100 as an example, assuming that the blockchain node 302 determines the block 100 as an infrequently accessed block and performs ECC 314, the ECC encoded data can be divided into a plurality of datasets based on a data storage scheme. A data storage scheme can be provided as a set of computer-executable instructions that define where and/or how data is to be stored within the blockchain network. In some examples, the data storage scheme can be provided by a trusted node with proof of authority and agreed to by the blockchain nodes. In some examples, the data storage scheme can be agreed to by the blockchain nodes through consensus. Generally, the data storage scheme can include one or more predetermined rules for dividing the encoded data to a plurality of datasets based on the number of blockchain nodes in a blockchain network. The data storage scheme can also include assignments of one or more datasets of the plurality of datasets to be stored or hashed by each of the blockchain nodes. To ensure data equality, the data storage scheme can include an assignment of at least one dataset to be stored by each blockchain node of the blockchain network.

In the example shown in FIG. 3, the encoded block data of block 100 is divided into four datasets, which are Data1, Data2, Data3, and Vdata1, each to be stored by one of the blockchain nodes 302, 304, 306, and 308. Vdata1 can represent the redundant bits of the ECC for error correction. Data1 is selected to be stored by the blockchain node 302 according to the data storage scheme. Data2, Data3, and Vdata1 are selected to be separately hashed 316 to generate hash values Dhash2, Dhash3, and Vhash1, respectively. In accordance with embodiments of this specification, the encoded data can be divided to more than four datasets when the blockchain network has more than four nodes. In some examples, each of the blockchain nodes can store more than one dataset and hash the rest of the datasets assigned to be stored by other nodes.

Figure 4:
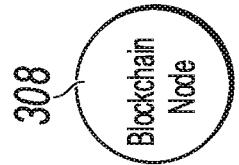
FIG. 4 depicts an example of a data storage scheme in accordance with embodiments of this specification.
Figure 4:
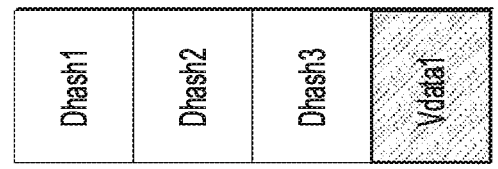
Figure 4:
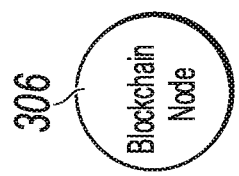
Figure 4:
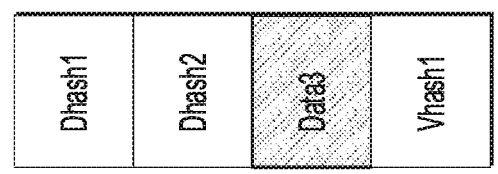
Figure 4:
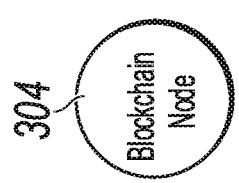
Figure 4:
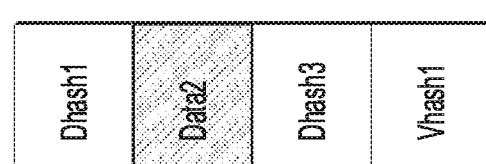
Figure 4:
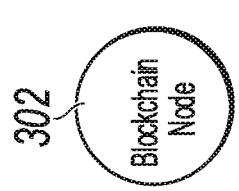
Figure 4:
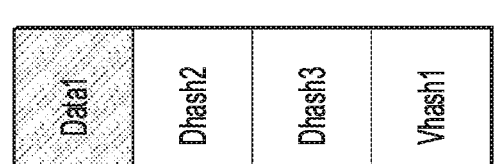

Referring now to FIG. 4, FIG. 4 depicts an example of a data storage scheme 400 in accordance with embodiments of this specification. As discussed earlier, Data1 is selected to be stored by the blockchain node 302 according to the data storage scheme 400. Based on the data storage scheme 400, blockchain node 304 stores Data2 and separately hashes Data1, Data3, and Vdata1 to generate hash values Dhash1, Dhash3, and Vhash1, respectively. Blockchain node 306 stores Data3 and separately hashes Data1, Data2, and Vdata1 to generate hash values Dhash1, Dhash2 and Vhash1, respectively. Blockchain node 308 stores Vdata1 and separately hashes Data1, Data2, and Vdata3 to generate hash values Dhash1, Dhash2 and Dhash3, respectively.

Referring back to FIG. 3, because the hash values correspond to encoded datasets of the same block, they can be indexed by a block ID of the block. For example, the blockchain node 302 can index Data1, Dhash1, Dhash2, and Vhash1 associated with block 100 with a block ID 100. As such, the blockchain node 302 can use the indexed block ID to map the hash values to their corresponding blocks. A more detailed example of indexing the datasets and hash values is discussed in the description of FIG. 6.

It is to be understood that other data storage schemes can be made for the blockchain nodes 302, 304, 306, and 308, according to the data storage scheme. In some examples, the encoded block data of block 100 can be divided to more than four datasets. It is to be understood that other data storage schemes can be made for the blockchain nodes 502, 504, 506, and 508, according to the data storage scheme.

After generating and storing Dhash2, Dhash3, and Vhash1, the blockchain node 302 can delete Data2, Data3, and Vdata1 from storage to save storage space. As such, for each block, the blockchain node 302 only stores one ECC encoded dataset (i.e., Data1) and three hash values (i.e., Dhash2, Dhash3, and Vhash1), instead of the entire block. As such, storage space can be significantly reduced. Similar to block 100, the encoding and hashing process can be performed for other infrequently accessed blocks that are stored by the blockchain nodes 304, 306, and 308.

When the blockchain node 302 determines that block data of the block 100 is needed for executing a smart contract, it can retrieve Data2, Data3, and Vdata1 from blockchain nodes 304, 306, and 308, respectively, according to the data storage scheme. To retrieve datasets from other blockchain nodes 304, 306, and 308, blockchain node 302 can send hash values corresponding to the datasets to be retrieved according to the data storage scheme.

For example, to retrieve Data2, the blockchain node 302 can send Dhash2 to the blockchain node 304. If the blockchain node 304 has Data2 stored, it can send the Data2 back to the blockchain node 302 in response to receiving the Dhash2. After receiving the Data2 from the blockchain node 304, the blockchain node 302 can hash the received dataset and compare the hash value with Dhash2. If the hash value is the same as Dhash2, the blockchain node 302 can determine that the received dataset is authentic. Otherwise, the received dataset is determined to be unauthentic. When the received dataset is determined as unauthentic, the blockchain node 302 can report the blockchain node 304 as a faulty node (or a Byzantine node). If the percentage of unauthentic data received by the blockchain node 302 is less than or equal to the maximum fraction of erroneous or missing bits that can be corrected by the ECC, block 100 can be recovered from the locally stored and received datasets.

As described earlier, blockchain networks can store different types of data such as state data, block data, and index data. State data are often stored as a content-addressed state tree, such as the MPT or the fixed depth Merkle tree (FDMT). Content-addressed state trees are incremental in nature. That is, changes of account states are reflected by adding new tree structures instead of only updating values of the existing state tree. Therefore, the content-addressed state trees can grow very large in size when blocks are continuously added to the blockchain. Under the FDMT storage scheme, state data can be separated into current state data associated with the current block and historic state data associated with all blocks of the blockchain. Most data in the FDMT are infrequently used historic state data. Storing all historic state data in every consensus node can be quite inefficient in terms of storage resource usage.

In some embodiments, similar to encoding and sharing block data, ECC such as erasure coding can be used to encode the historic state data. Each consensus node in the blockchain network stores only a portion of the historic state data and retrieves the rest of the historic state data from other nodes to reduce storage consumption. By sharing ECC encoded historic state data instead of the original historic state data, even if unauthentic data exists or data loss occurs, the original historic state data can be recovered, as long as the percentage of unauthentic data or data loss is less than or equal to the maximum fraction of erroneous or missing bits that can be corrected by the ECC.

Figure 5:
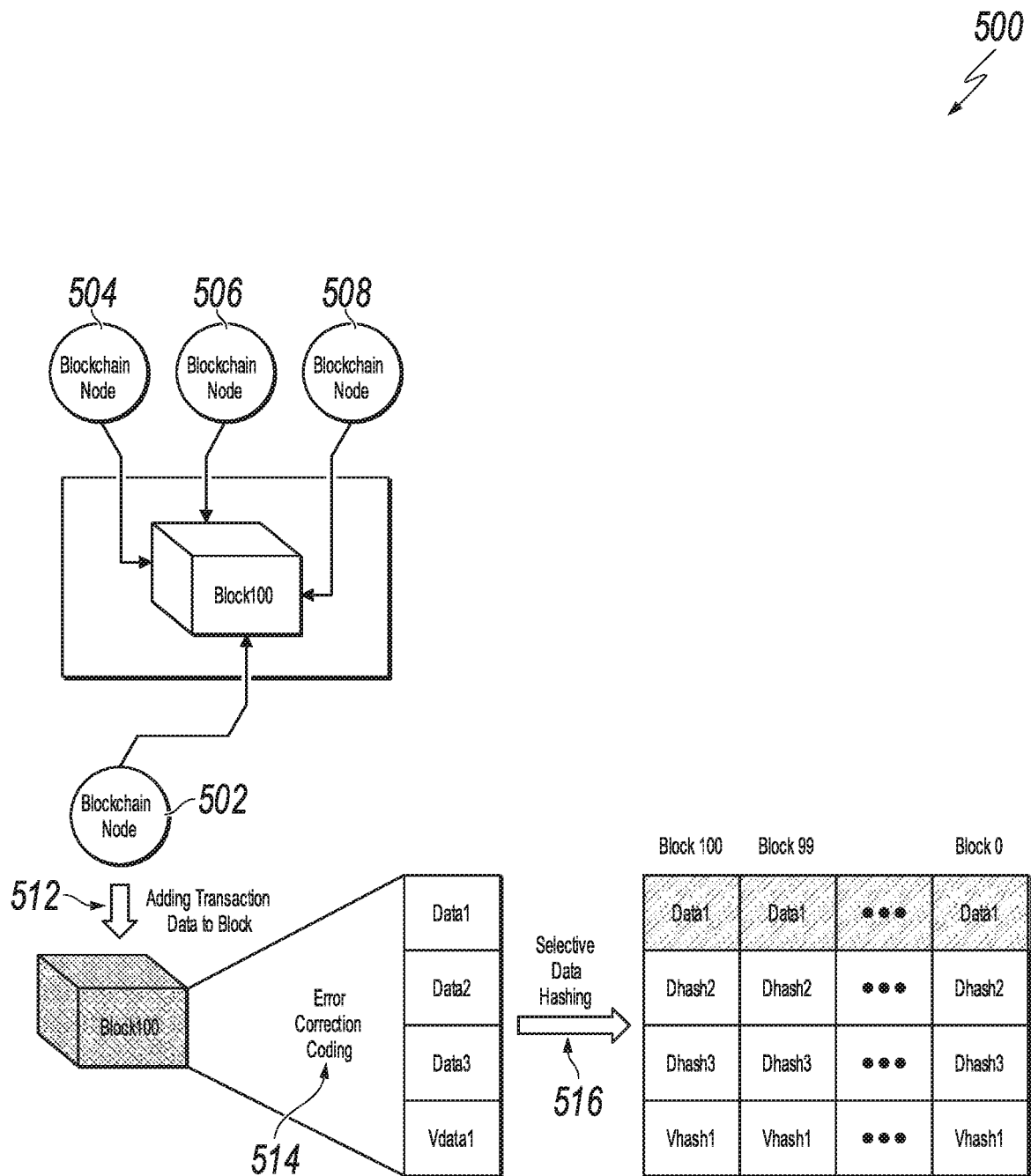
FIG. 5 depicts another example of a block data encoding and hashing process in accordance with embodiments of this specification.

FIG. 5 depicts another example of a block data encoding and hashing process 500 in accordance with embodiments of this specification. In this example, a blockchain network of four blockchain nodes is depicted, which are blockchain nodes 502, 504, 506, and 508. Using blockchain node 502 as an example to illustrate the encoding and hashing process 500, when new block data are added to the block 512, the blockchain node 502 can perform ECC 514 to encode the block data. As compared to the encoding and hashing process 300 discussed in the description of FIG. 3, the blockchain node 502 performs ECC on the block data as they are written to a block. As such, the blockchain node 502 does not need to store the entire block, but can instead, store a selected portion of the ECC encoded block data and hash values corresponding to the rest of the encoded block data based on the data storage scheme. This encoding and hashing process 500 can be especially suitable for scenarios when blockchain node 502 has low disk space.

In some embodiments, instead of storing data as blocks, the blockchain node 502 can store a write-ahead log (WAL) file or other similar roll-forward journal files. The WAL file can record block data that have been committed but not yet stored by the blockchain node 502. Using the WAL file, the original blockchain data can be preserved in the database file, while changes of the blockchain data can be written into a separate WAL file. A commit to roll-forward with the changes can happen without ever writing to the original blockchain data. This arrangement allows continued operations of the blockchain data while changes are committed into the WAL file. By using the WAL file to store changes made through the encoding and hashing process 500, the blockchain node 502 can indicate that it has the block data for consensus, while performing the ECC in the background when appropriate. As such, the ECC can be performed when utilization rate of computational resource of the blockchain node 302 is low, in order to reduce the impact on computational efficiency or latency of the consensus process.

In some embodiments, the blockchain node 502 can store the block data in a buffer. The blockchain node 502 can perform ECC to the block data stored in the buffer when the size of the data is greater than a predetermined threshold or when the buffer is full. After performing ECC, the blockchain node 502 can follow the encoding and hashing process 500 to store encoded block data and hash values, as discussed in the description below.

Using block 100 as an example again, after performing the ECC, the encoded block data can be divided into a plurality of datasets based on the data storage scheme. Similar to the example discussed in the description of FIG. 3, the encoded block data of block 100 can be divided into four datasets, which are Data1, Data2, Data3, and Vdata1, each to be stored by one of the blockchain nodes 502, 504, 506, and 508. Vdata1 can represent the redundant bits of the ECC. Data1 is selected to be stored by the blockchain node 502 according to the data storage scheme. Data2, Data3, and Vdata1 are selected to be separately hashed 516 to generate hash values Dhash2, Dhash3, and Vhash1, respectively.

The hash values can be indexed by a block ID of a corresponding block of the hash values. For example, the blockchain node 502 can index Data1, Dhash1, Dhash2, and Vhash1 associated with block 100 with a block ID 100. As such, the blockchain node 502 can use the indexed block ID to map the hash values to their corresponding blocks. A more detailed example of indexing the datasets and hash values is discussed in the description of FIG. 6.

It is to be understood that other data storage schemes can be made for the one or more blockchain nodes 502, 504, 506, and 508, according to the data storage scheme. For example, the encoded block data of block 100 can be divided into more than four datasets. Each of the blockchain nodes 502, 504, 506, and 508 can store more than one dataset and hash the rest of the datasets stored by other nodes.

After generating Dhash2, Dhash3, and Vhash1, the blockchain node 502 can store Data1, Dhash2, Dhash3, and Vhash1 and delete Data2, Data3, and Vdata1 from storage to save storage space. As such, for each block of the blockchain, the blockchain node 502 only stores one dataset (i.e., Data1) and three hash values (i.e., Dhash2, Dhash3, and Vhash1) of the ECC encoded block data instead of the original block data to save on storage space. When the blockchain node 502 determines that block data of the block 100 is needed for executing a smart contract, it can retrieve Data2, Data3, and Vdata1 from blockchain nodes 504, 506, and 508, respectively, according to the data storage scheme.

To retrieve datasets from other blockchain nodes 504, 506, and 508, blockchain node 502 can send hash values corresponding to the datasets to be retrieved according to the data storage scheme. For example, to retrieve Data2, the blockchain node 502 can send Dhash2 to the blockchain node 504. If the blockchain node 504 has Data2 stored, it can send the Data2 back to the blockchain node 502 in response to receiving the Dhash2. After receiving the Data2 from the blockchain node 504, the blockchain node 502 can hash the received dataset and compare the hash value with Dhash2. If the hash value is the same as Dhash2, the blockchain node 502 can determine that the received dataset is authentic. Otherwise, the received dataset can be determined as unauthentic. When the received dataset is determined as unauthentic, the blockchain node 502 can report the blockchain node 504 as a faulty node (or a Byzantine node). If the percentage of unauthentic data received by the blockchain node 502 is less than or equal to the maximum fraction of erroneous or missing bits that can be corrected by the ECC, block 100 can be recovered from the locally stored and received datasets.

As discussed earlier, by performing the encoding and hashing process, blockchain data can be ECC encoded and divided into a plurality of datasets. To save on storage space, each blockchain node can store one or more of the plurality of datasets and hash values of rest of the datasets based on a data storage scheme. The stored datasets and hash values can be indexed with Block IDs in order for a blockchain node to retrieve datasets from other nodes to recover original data.

Figure 6:
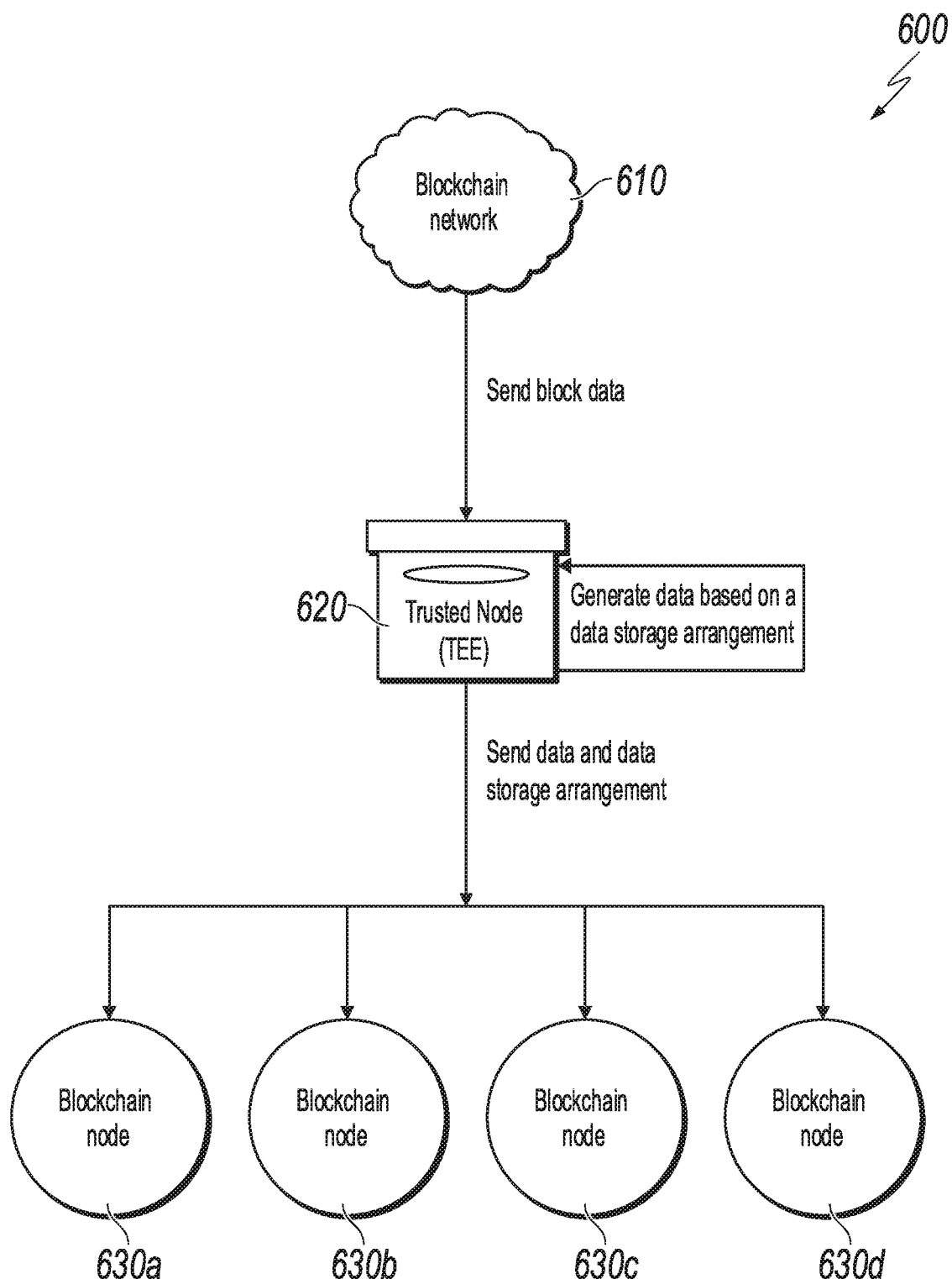
FIG. 6 depicts an example of a process of shared blockchain data storage based on a trusted execution environment (TEE) in accordance with embodiments of this specification.

FIG. 6 depicts an example of a process 600 of shared blockchain data storage based on TEE in accordance with embodiments of this specification. In this example, it is assumed that a blockchain network 610 includes four blockchain nodes, which are blockchain nodes 630a-d. The blockchain network 610 also includes, or is in communication with, a trusted node 620 hosting a TEE. The trusted node 620 can be a computing device, a computing system, or a cloud computing system. As discussed earlier, the TEE can be hosted by one or more data processors of the trusted node 620 isolated from the one or more data processors' operating system and is configured to provide enhanced confidentiality and integrity of code executing and data loading within the one or more data processors.

In some embodiments, the trusted node 620 can be a node with proof of authority (POA). In some examples, the POA can be provided based on the status of the trusted node 620. For example, the trusted node 620 can be a node administered by a deployer of the blockchain network 610. In such cases, the trusted node 620 can be part of the blockchain network 610 or outside of the blockchain network 610. In some examples, the POA can be gained through voting. For example, assume that the blockchain network includes 3f+1 nodes (f=1 in the example as depicted in FIG. 6, when the trusted node 620 participates in consensus of the blockchain network 620), the maximum faulty consensus nodes or Byzantine nodes (i.e., nodes that fail to act or act maliciously) that can be tolerated is f under the PBFT consensus protocol. As such, if 2f+1 nodes cast votes (endorsed by their respective digital signatures) to elect the trusted node 620, the 2f+1 votes received can be used as POA of the trusted node 620.

As discussed earlier, a TA, such as an SGX enabled application, can include a trusted component (or enclave component) and an untrusted component (application component). The application component is located outside of the TEE and can access the TEE's TCB through enclave interface functions. In some embodiments, these enclave interface functions are an application programming interface (API) used by the application component. The application component can use the API to make "ecalls" to invoke a virtual machine in the TEE to execute smart contracts. The virtual machine can be a software program that executes program instructions encoded in a particular programming language or in a binary format such as a bitstream. In some examples, the virtual machine may provide an abstraction layer between the program instructions and the underlying hardware of the computing device executing the virtual machine. Such a configuration can allow for the same program instructions to be executed in the same way across different computing devices having different hardware.

In some embodiments, an ecall can be made by an application component to execute a smart contract for executing one or more software instructions according to the encoding and hashing processes 300 and 500 as discussed in the description of FIGS. 3 and 5. The TEE can then perform data processing during multiple events that occur throughout the multiple steps of the processes 300, 500. The verified record of the data derived from events associated with the multiple steps of the processes 300, 500 is more reliable than a record based on only the end result of the processes 300, 500. In other words, by using the TEE technology, for each piece of data that needs to be verified, not only is the piece of data itself verified, the processes that comprise multiple steps of generating the piece of data are also verified. This ensures that the final piece of data is highly reliable because the probability that every step of the process has been fraudulently modified is low. As such, the encoding and hashing processes 300, 500, if performed under the TEE 620, can be performed a single time. The computational results are verifiable based on the steps of the processes 300, 500, and can be trusted and used by the blockchain nodes 630a-d. In comparison, without TEE, each blockchain node needs to individually perform the encoding and hashing process 300 or 500, which can significantly increase the computing resource consumption of the overall blockchain network.

In some embodiments, one or more blockchain nodes 603a-d can send blockchain data to the trusted node 620. The blockchain data can include infrequently accessed blocks as discussed in the description of FIG. 3. The trusted node 620 can invoke the enclave component of the TEE to execute one or more software instructions based on a data storage scheme. For example, the data storage scheme can be the arrangement 400 discussed in the description of FIG. 4. After encoding each of the infrequently accessed blocks to generate ECC encoded blocks. Each ECC encoded block can be divided into four datasets based on the data storage scheme. The datasets can be expressed as Data1, Data2, Data3, and Vdata1, each to be kept by one of the blockchain nodes 630a-d. Vdata1 can represent the redundant bits of the ECC for error correction. In some embodiments, the trusted node 620 can also calculate, under TEE, hash values of Data1, Data2, Data3, and Vdata1 expressed as Dhash1, Dhash2, Dhash3, and Vhash1, respectively.

In some embodiments, the datasets and the hash values can be indexed by their corresponding block IDs. For example, the blockchain node 630a can index Data1, Dhash1, Dhash2, and Vhash1 associated with block 100 with a block ID 100. As such, the blockchain nodes 630a-d can use the indexed block ID to map the hash values to their corresponding blocks for data recovery.

After dividing each of the encoded blocks to datasets Data1, Data2, Data3, and Vdata1, the trusted node 620 can send the datasets and the data storage scheme to each of the blockchain nodes 630a-d. After receiving the datasets, each blockchain node can store one or more datasets and hash the remainder of the datasets based on the data storage scheme. For example, blockchain node 630a can store Data1 and hash Data2, Data3, and Vdata1 to generate Dhash2, Dhash3, and Vhash1. After the one or more datasets and hash values are stored, the corresponding block and the remainder of the datasets can be deleted to save storage space of the blockchain node. For example, after the Data1, Dhash2, Dhash3, and Vhash1 associated with block 100 are stored, Data2, Data3, Vdata1, and block 100 can be deleted from the blockchain node.

In some embodiments, the trusted node 620 can generate a checksum derived based on the blockchain data. The checksum can also be sent to the blockchain nodes 630a-d for error detection to ensure data integrity. When the blockchain node 630a determines that blockchain data of the block 100 is needed for executing a smart contract, it can retrieve Data2, Data3, and Vdata1 from the trusted node, or send corresponding hash values to retrieve the datasets from blockchain nodes 630b, 630c, and 630d. The retrieved datasets can then be combined with Data1 to recover the corresponding block.

As described herein, by loading data to a TEE for processing, the confidentiality and integrity of the data can be protected. The trusted node 620 can be trusted to generate verifiable encoded blocks, divide the encoded blocks to datasets, and send the datasets and the data storage scheme to each of the blockchain nodes for storage. Each blockchain node can then store a portion of the datasets based on the data storage scheme to save on storage space. By having a TEE enabled trusted node, the ECC needs only to be performed once by the trusted node, instead of separately performed by each blockchain node. As such, the overall computing resource consumption of the blockchain network can be significantly reduced.

Figure 7:
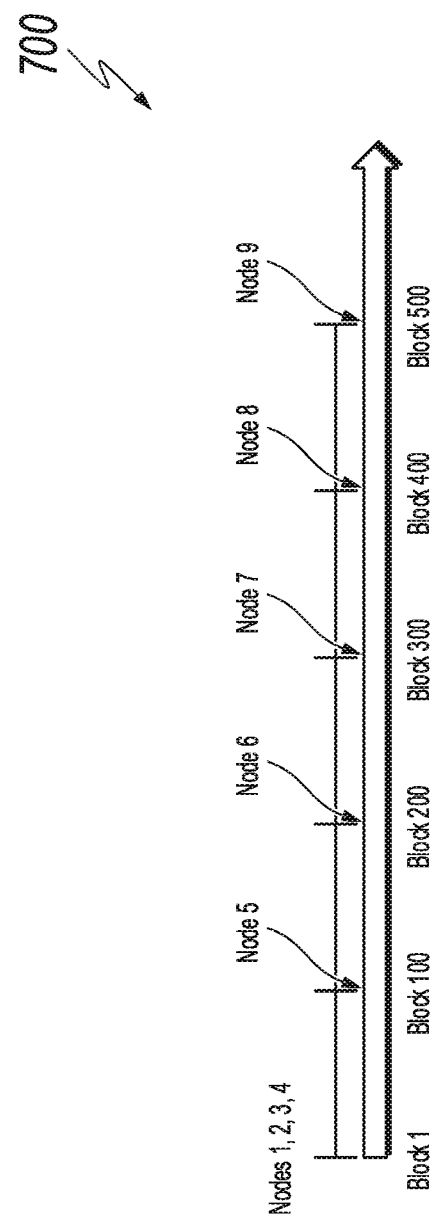
FIG. 7 depicts an example of adding blockchain nodes to a blockchain network in accordance with embodiments of this specification.

FIG. 7 depicts an example 700 of adding blockchain nodes to a blockchain network in accordance with embodiments of this specification. As discussed earlier, the encoding and hashing process can be performed to effectively reduce storage consumption of a blockchain network. Under the PBFT consensus protocol, if the total number of blockchain nodes is denoted by N, the number of faulty blockchain nodes is denoted by f, then N>3f must satisfy for the blockchain network to be Byzantine fault tolerant. For example, in a four-node blockchain network, the maximum number of faulty nodes tolerable by the blockchain network is 1 under the PBFT consensus protocol. In other words, the minimum number of honest blockchain nodes required by the blockchain network is 3. As such, if the blockchain nodes perform ECC to the original blockchain data (or original data) with a code rate of no greater than 3/4 (i.e., the proportion of the original data is no more than ¾ of the total encoded data), and each stores a quarter of the encoded blockchain data (or encoded), the original data can be recovered even if one of the blockchain nodes is a faulty node. The redundancy rate can be defined as a total volume of encoded data and original data stored by the blockchain nodes of the blockchain network divided by the volume of a copy of the original data. In this example, since no blockchain node stores the original data, the redundancy rate is the inverse of the code rate (i.e., the volume of encoded data divided by the original data), which is 4/3.

In the depicted example 700, it is assumed that when blocks 1 to 100 are generated, there are four blockchain nodes, nodes 1, 2, 3, and 4, in the blockchain network. Under PBFT consensus protocol, the minimum number of honest blockchain nodes required by the blockchain network is three. Applying the encoding and hashing process as discussed in the descriptions of FIGS. 3 and 5, blocks 1 to 100 can each be encoded with a maximum code rate of 3/4. The encoded blocks can each be divided into three datasets of original data and one dataset of redundant bits to be stored by the four blockchain nodes.

Node 5 is added to the blockchain network as a full node during the generation of block 101. That is, Node 5 stores an entire copy of blocks 1 to 100, but participates in the encoding and hashing process with the four existing blockchain nodes starting from the generation of block 101. Assuming that the blockchain network has five blockchain nodes during the generation of blocks 101 to 200, the minimum number of honest blockchain nodes required by the blockchain network is four under the PBFT consensus protocol. As such, blocks 101 to 200 can each be encoded with a maximum code rate of 4/5. The encoded blocks can each be divided into four datasets of original data and one dataset of redundant bits to be stored by the five blockchain nodes in the blockchain network.

Node 6 is added to the blockchain network as a full node during the generation of block 201. That is, Node 6 stores an entire copy of blocks 1 to 200, but participates in the encoding and hashing process with other blockchain nodes of the blockchain network since the generation of block 201. Assuming that the blockchain network has six blockchain nodes during the generation of blocks 201 to 300, the minimum number of honest blockchain nodes required by the blockchain network is five under the PBFT consensus protocol. As such, blocks 201 to 300 can each be encoded with a maximum code rate of 5/6. The encoded blocks can each be divided into four datasets of original data and two datasets of redundant bits to be stored by the six blockchain nodes in the blockchain network.

Node 7 is added to the blockchain network as a full node during the generation of block 301. That is, Node 7 stores an entire copy of blocks 1 to 300, but participates in the encoding and hashing process with other blockchain nodes of the blockchain network since the generation of block 301. Assuming that the blockchain network has seven blockchain nodes during the generation of blocks 301 to 400, the minimum number of honest blockchain nodes required by the blockchain network is five under the PBFT consensus protocol. As such, blocks 301 to 400 can each be encoded with a maximum code rate of 5/7. The encoded blocks can each be divided into five datasets of original data and two datasets of redundant bits to be stored by the seven blockchain nodes in the blockchain network.

Node 8 is added to the blockchain network as a full node during the generation of block 401. That is, Node 8 stores an entire copy of blocks 1 to 400, but participates in the encoding and hashing process with other blockchain nodes of the blockchain network since the generation of block 401. Assuming that the blockchain network has eight blockchain nodes during the generation of blocks 401 to 500, the minimum number of honest blockchain nodes required by the blockchain network is six under the PBFT consensus protocol. As such, blocks 401 to 500 can each be encoded with a maximum code rate of 3/4. The encoded blocks can each be divided into six datasets of original data and two datasets of redundant bits to be stored by the eight blockchain nodes in the blockchain network.

Node 9 is added to the blockchain network as a full node during the generation of block 501. That is, Node 9 stores an entire copy of blocks 1 to 500, but participates in the encoding and hashing process with other blockchain nodes of the blockchain network since the generation of block 501.

TABLE 1

| Block IDs | Redundancy Rate | Fault Tolerance |
|---|---|---|
| 1-100 | 5 + (3 + 1)/3 | 6/9 |
| 101-200 | 4 + (4 + 1)/4 | 5/9 |
| 201-300 | 3 + (5 + 1)/5 | 4/9 |
| 301-400 | 2 + (5 + 2)/5 | 4/9 |
| 401-500 | 1 + (6 + 2)/6 | 3/9 |

Table 1 shows the redundancy rate and fault tolerance of blocks 1-500 under the blockchain network with nine blockchain nodes according to the above example 700. Nodes 1, 2, 3, and 4 store datasets divided from ECC encoded blocks 1 to 100. Nodes 5, 6, 7, 8, and 9 store the original blocks 1 to 100. Since the code rate for encoding blocks 1 to 100 is 3/4, nodes 1, 2, 3, and 4 store 4/3 copies of the original blocks. Nodes 5, 6, 7, 8, and 9 each stores one copy of the original blocks. Therefore, the redundancy rate of storing blocks 1 to 100 is 5+4/3. The fault tolerance is the proportion of faulty blockchain nodes that can be tolerated by the blockchain network. Since nodes 5, 6, 7, 8, and 9 store the original blocks 1 to 100, as long as any one of them is an honest blockchain node, it can provide the original blocks to other blockchain nodes of the blockchain network. If nodes 5, 6, 7, 8, and 9 are all faulty blockchain nodes, three of nodes 1, 2, 3, and 4 that store the datasets need to be honest nodes for recovering a copy of the original blocks. Therefore, a maximum of 6 out of the 9 blockchain nodes can be faulty blockchain nodes. The fault tolerance is 2/3.

Assume that each blockchain node stores one dataset, if the number of datasets divided from ECC encoded blocks is E, the number of blockchain nodes that store the original blocks can then be calculated as N−E. Based on the analysis above, if m blockchain nodes store datasets of redundant bits, the maximum allowable faulty blockchain nodes, DF, can be expressed as DF=m+N−E. Since DF is greater than equal to f, it can be inferred that E−m<N−F. That is, when E−m<N−F (E>0), the code rate of the ECC, E−m/E, is low enough to tolerate the F out of N faulty nodes and ensure safety of data recovery. The redundancy rate, r, can be expressed as r=N−E+E/(E−m).

For blocks 101 to 200, nodes 1, 2, 3, 4, and 5 store datasets divided from ECC encoded blocks 101 to 200. Nodes 6, 7, 8, and 9 store the original blocks. Since the code rate for encoding blocks 101 to 200 is 4/5, nodes 1, 2, 3, 4, and 5 store 5/4 copies of the original blocks. Nodes 6, 7, 8, and 9 each stores one copy of the original blocks. Therefore, the redundancy rate of storing blocks 101 to 200 is 4+5/4. A maximum of 5 out of the 9 blockchain nodes can be faulty blockchain nodes. The fault tolerance is 5/9.

For blocks 201 to 300, nodes 1, 2, 3, 4, 5, and 6 store datasets divided from ECC encoded blocks 201 to 300. Nodes 7, 8, and 9 store the original blocks. Since the code rate for encoding blocks 201 to 300 is 2/3, nodes 1, 2, 3, 4, 5, and 6 store 6/5 copies of the original blocks. Nodes 7, 8, and 9 each stores one copy of the original blocks. Therefore, the redundancy rate of storing blocks 201 to 300 is 3+6/5. A maximum of 4 out of the 9 blockchain nodes can be faulty blockchain nodes. The fault tolerance is 4/9.

For blocks 301 to 400, nodes 1, 2, 3, 4, 5, 6, and 7 store datasets divided from ECC encoded blocks 301 to 400. Nodes 8, and 9 store the original blocks. Since the code rate for encoding blocks 301 to 400 is 5/7, nodes 1, 2, 3, 4, 5, 6 and 7 store 7/5 copies of the original blocks. Nodes 8, and 9 each stores one copy of the original blocks. Therefore, the redundancy rate of storing blocks 301 to 400 is 2+7/5. A maximum of 4 out of the 9 blockchain nodes can be faulty blockchain nodes. The fault tolerance is 4/9.

For blocks 401 to 500, nodes 1, 2, 3, 4, 5, 6, 7, and 8 store datasets divided from ECC encoded blocks 301 to 400. Node 9 stores the original blocks. Since the code rate for encoding blocks 401 to 500 is 3/4, nodes 1, 2, 3, 4, 5, 6, 7 and 8 store 4/3 copies of the original blocks. Node 9 stores one copy of the original blocks. Therefore, the redundancy rate of storing blocks 401 to 500 is 1+7/5. A maximum of 3 out of the 9 blockchain nodes can be faulty blockchain nodes. The fault tolerance is 1/3.

If the blockchain nodes agree to reperform ECC encoding to blocks 1 to 500, since the maximum number of faulty blockchain nodes tolerable by the blockchain network of 9 blockchain nodes is 2, the maximum code rate of the ECC is 7/9. After performing the encoding and hashing process, the fault tolerance is reduced to 2/9. On the other hand, the redundancy rate is reduced to 9/7, which is significantly lower than the redundancy rates before reperforming the process. Therefore, reperforming the Encoding and hashing process when original blocks are stored in at least one blockchain node effectively reduces redundancy rate and storage consumption of the system.

In some cases, a blockchain node may determine that the blockchain data it stores exceeds a predetermined data volume threshold. In such cases, the blockchain node can initiate a request to other blockchain nodes for reperforming the Encoding and hashing process to one or more blocks in order to reduce redundancy rate of the blockchain network. In some cases, the request for reperforming the Encoding and hashing process can be initiated by a trusted node outside of the blockchain network, such as in response to determining that the redundancy rate of the blockchain network is greater than a predetermined threshold. For example, for a blockchain network with nine blockchain nodes as depicted in the example 700, the minimum redundancy rate under PBFT protocol is 9/7. The trusted node can initiate the request when the redundancy rate of the one or more blocks are over 2. In some embodiments, the blocks can be selected to reperforming the Encoding and hashing process based on their redundancy rate. The blocks with higher redundancy rate can be selected with higher priority due to larger savings on storage.

The request for reperforming the Encoding and hashing process can include a maximum code rate for performing the ECC that accounts for the maximum number of faulty blockchain nodes tolerable (i.e., f/(3f+1)). The request can also include instructions of dividing each coded block of the one or more coded blocks to a plurality of datasets and assigning the plurality of datasets to the blockchain nodes of the blockchain network. For example, the instructions can instruct each encoded block to be divided to nine datasets, each dataset to be assigned to one of the nine blockchain nodes. In some cases, the instructions are provided by the data storage scheme as discussed in the descriptions of FIGS. 3 to 5.

If the request is initiated by a blockchain node, the blockchain network can go through the three-phase process (pre-prepare, prepare, and commit phases) of a PBFT algorithm to reach consensus of re-ECC according to the instructions included in the request. The blockchain node initiating the request can act as a primary blockchain node for performing the PBFT algorithm. Any blockchain node receiving the request can identify and retrieve the one or more blocks from the primary blockchain node.

The blockchain nodes can also directly reperform the ECC according to the instructions if the request is received from the trusted node with proof of authority. In such case, the request can also include identifications identifying at least one blockchain node that stores the one or more blocks. The blockchain node receiving the request can then identify the at least one blockchain node of the blockchain network that stores the one or more blocks based on the request and retrieve the one or more blocks from one of the at least one blockchain node.

To retrieve the one or more blocks, the blockchain node can send hash values of the one or more blocks to one of the at least one blockchain node. In some examples, the hash values are stored in block headers of the blockchain. After receiving the one or more blocks, the blockchain node can determine whether the received one or more blocks are authenticate by comparing hash values of the received one or more blocks with corresponding hash values it sent. If the hash values are the same, the received one or more blocks can be determined as authentic. Otherwise, the blockchain node can report the blockchain node that the one or more blocks are received from as faulty node.

The blockchain node can then perform ECC of the one or more blocks based on the code rate provided in the request to generate one or more coded blocks. In the example illustrated in FIG. 6, for each coded block of the one or more coded blocks, the blockchain node can divide the coded block into nine datasets according to the instructions and store at least one of nine datasets assigned to the blockchain node according to the instructions. The blockchain nodes can then hash the remaining eight of the plurality of datasets to generate hash values corresponding to remaining eight datasets, store the hash values, and delete the one or more blocks. Afterwards, the encoding and hashing process for the one or more blocks is then completed.

After the encoding and hashing process is completed for all available blocks, if the redundancy rate of the blockchain network still exceeds a predetermined data storage threshold or the storage consumption of a blockchain node is greater than a predetermined data storage threshold, the blockchain node can notify other blockchain nodes to trigger another round of encoding and hashing process in response to new blockchain nodes that are added to the blockchain network. For example, if eight blockchain nodes perform the encoding and hashing process to blocks 1 to 400 before node 9 is added, and the storage consumption of a blockchain node is still greater than 90% of node 8's storage capacity, node 8 can send a notification to nodes 1 to 7 to perform another round of encoding and hashing process to blocks that have been generated after node 8 is added.

Figure 8:
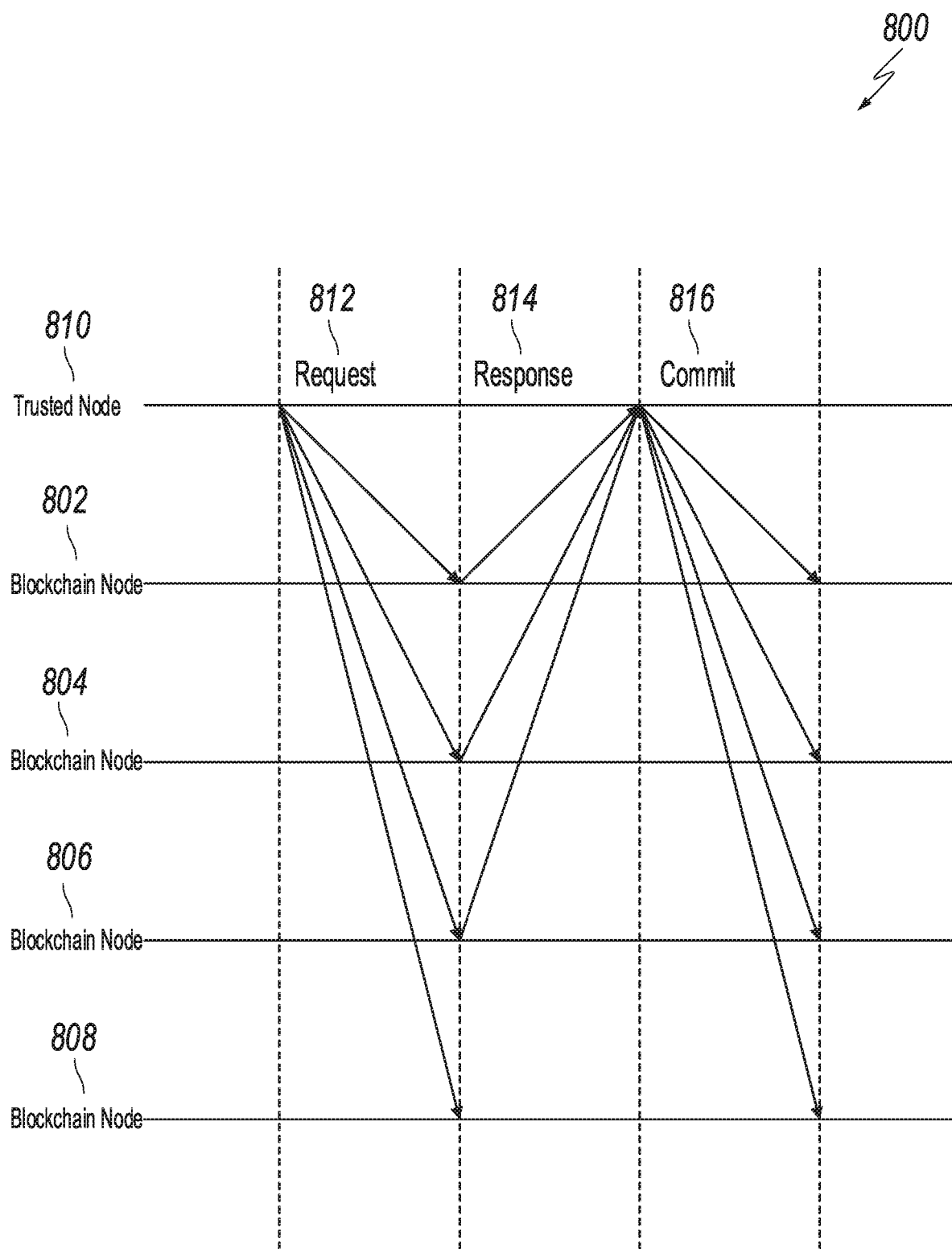
FIG. 8 depicts an example of a consensus process in accordance with embodiments of this specification.

FIG. 8 depicts an example of a consensus process 800 in accordance with embodiments of this specification. In this example, the consensus process 800 is performed by a trusted node 810 and four blockchain nodes 802, 804, 806, and 808 of a blockchain network. As discussed in the description of FIG. 7, when new full blockchain nodes are added to a blockchain network, since the full nodes have not participated in the encoding and hashing process, they store the original blocks instead of datasets divided from ECC encoded blocks. The redundancy rate of the blocks stored by the full nodes may be reduced by re-ECC of the blocks with a higher code rate.

However, performing re-ECC on each blockchain node can significantly increase the computational burden of the blockchain network. As discussed in the description of FIG. 6, blockchain data can be loaded to a TEE of the trusted node 810. The trusted node 810 can generate verifiable encoded blocks, divide the encoded blocks to datasets, and send the datasets and a data storage scheme to each blockchain node for storage. By having a TEE enabled trusted node, the ECC needs to be performed only once, instead of separately performed by each blockchain node. The overall computational resource consumption of the blockchain network can be reduced.

In some embodiments, a blockchain node can send a request to the trusted node 810 for reperforming the encoding and hashing process to one or more blocks. After receiving the request, the trusted node 810 can identify a blockchain node 802, 804, 806, or 808 of the blockchain network that stores the one or more blocks. The blockchain node can be the same node that sent the request or can be a different blockchain node that stores the one or more blocks. Assuming that the trusted node 810 identifies that blockchain node 802 stores the one or more blocks, the trusted node 810 can retrieve the one or more blocks from blockchain node 802. To retrieve the one or more blocks, the trusted node 810 can send hash values corresponding to the one or more blocks to the blockchain node 802. The blockchain node 802 can identify the one or more blocks corresponding to the hash values and send them to the trusted node 810.

When new blockchain nodes are added to a blockchain network, the trusted node 810 can enforce a new data storage scheme to the blockchain network for storage optimization. For example, for a four-node blockchain network that adopts the data storage scheme as discussed in the description of FIG. 4, the maximum ECC code rate is 3/4. When a new full node is added to the blockchain, the trusted node 810 can enforce a new data storage scheme that involves all the five blockchain nodes. Since a five-node blockchain network can tolerate only one faulty blockchain node, the maximum ECC code rate can be increased to 4/5 to improve storage efficiency.

Therefore, based on the new data storage scheme, the trusted node 810 can encode the one or more blocks using ECC with a higher code rate. For each of the one or more blocks, the trusted node 810 can then divide the block into a plurality of datasets and calculate hash values of the plurality of datasets.

To enforce the new data storage scheme, the trusted node 810 can engage the blockchain nodes 802, 804, 806, and 808 in a consensus process 800. The consensus process 800 is performed such that the trusted node 810 can confirm that the blockchain nodes agree to the new data storage scheme such that the datasets under the new data storage scheme can be used to replace the existing data stored by the blockchain nodes 802, 804, 806, and 808 to save storage space.

The consensus process 800 can be a three-phase process, which includes a request phase 812, a response phase 814, and a commit phase 816. After the consensus process 800, the new data storage scheme can be activated by the trusted node 810 and adopted by the blockchain nodes 802, 804, 806, and 808. The blockchain nodes 802, 804, 806, and 808 can then store or recover blockchain data based on the new data storage scheme. The PBFT consensus protocol is used herein to describe the consensus process 800. Other consensus protocols such as Proof of Work (PoW), Proof of Stake (PoS) and Delegated Proof of Stake (DPoS) can be additionally or alternatively used to reach consensus in accordance with embodiments of this specification.

At the request phase 812, the trusted node 810 can send a request to each of the blockchain nodes 802, 804, 806, and 808. In some embodiments, the request can include data assigned to be stored by each of the blockchain nodes. The assigned data assigned can include at least one of the plurality of datasets, the hash values, or an index that provides a correspondence between the plurality of datasets and each of the blockchain nodes. The assigned data is meant to replace the data associated with the one or more blocks currently stored by the blockchain nodes to save storage space. In some examples, the index can show a correspondence between the plurality of datasets and the blockchain nodes 802, 804, 806, and 808, such as the correspondence according to the data management scheme 400 depicted in FIG. 4. The index can provide that blockchain node 802 stores Data1, blockchain node 804 stores Data2, blockchain node 806 stores Data3, and blockchain node 808 stores Vdata1. In some examples, the request can also include a digital signature of the trusted node 810 for the recipients to verify the identity of the trusted node 810.

After the blockchain nodes 802, 804, 806, and 808 receive the request, each of them can individually respond to the request at the response phase 814. The response message can include an indication that the respective blockchain node has received and accepted the new data storage scheme. In some embodiments, the response messages may not be synchronously received by the trusted node 810. For example, some of the blockchain nodes may be faulty, busy, or disconnected to the blockchain network, which may cause their response messages to be delayed or unavailable. Therefore, before the blockchain nodes 802, 804, 806, and 808 receives confirmation from the trusted node 810 that enough response messages have been received to reach consensus, they can store the assigned datasets, hash values, and index without deleting the pre-existing data. To achieve faster synchronization, each blockchain node can use its private key to digitally sign its response message. As such, each response message bears a digital signature of its sending node. Even if the sending node is disconnected, or otherwise unavailable, the trusted node 810 can verify the response message and proceed with the consensus process 800 without additional delays.

The consensus process 800 can enter the commit phase 816 if the trusted node 810 receives N−DF=E−m response messages from the blockchain nodes. By receiving E−m response messages, the trusted node 810 can determine that the blockchain nodes 802, 804, 806, and 808 have reached consensus of adopting the new data storage scheme provided by the trusted node 810. Accordingly, the trusted node 810 can send a commit message to each of the blockchain nodes 802, 804, 806, and 808 to activate the new data storage scheme. After receiving the commit message, the blockchain nodes 802, 804, 806, and 808 can, in some embodiments, delete the pre-existing data corresponding to the blocks to reduce storage consumption.

In some embodiments, the trusted node 810 reperforms ECC and the consensus process 800 in response to a blockchain node dropping out or being deleted from the blockchain network. For example, for each of the plurality of blocks, the trusted node 810 can determine the number of blockchain nodes that store at least a portion of an ECC encoded block, E, and the number of blockchain nodes that store at least a portion of redundant bits of the ECC encoded block, m. The trusted node 810 can also determine a total number of blockchain nodes of the blockchain network, N, and a maximum number of faulty blockchain nodes tolerable by the blockchain network, f. The trusted node 810 can then re-ECC of the plurality of blocks based on an (N−f)/N code rate if it determines that E−m>N−F.

In some embodiments, the trusted node 810 can perform the ECC when utilization rate of its computational resource is less than or equal to a predetermined value. For example, the ECC can be performed when the CPU usage of the trusted node 810 is below 50%.

In some embodiments, when a blockchain network includes a plurality of full nodes, the redundancy rate of the blocks stored by the full nodes can be relatively high since the full nodes have not shared the storage of the datasets divided from the ECC encoded blocks. In some cases, re-ECC of every block can be demanding on computational resource. In such cases, it can be beneficial to determine priority values of the blocks and prioritize the re-ECC to blocks that can result in larger storage savings.

As described earlier, the redundancy rate of a block stored in an N-node blockchain network can be expressed as r=N−E+E/(E−m). A priority value of the block can be defined as N−r=E−E/(E−m). The lower the priority value, the higher the re-ECC priority of the block. In other words, a block with lower priority value can have higher redundancy rate deduction after the re-ECC operation is performed to the block. Therefore, the blockchain network can prioritize re-ECC to blocks with the lowest priority value. The re-ECC can be based on the maximum allowable code rate (N−f)/N to achieve largest storage savings.

In some embodiments, the trusted node 810 can maintain the priority values in a priority index. The priority index can provide a correspondence between block ID of each block and its corresponding priority value. After re-ECC of a block, the priority index can be updated based on the new priority value calculated based on the re-ECC code rate.

After re-ECC and sharing storage of ECC encoded blocks, if a blockchain node determines that the blockchain data it stores still has a size exceeding a predetermined data storage threshold, it can send a notification to the trusted node 810 to add additional blocks to re-ECC. After receiving the notification, the trusted node 810 can select the additional blocks to re-ECC based on the priority values of the priority index.

Figure 9:
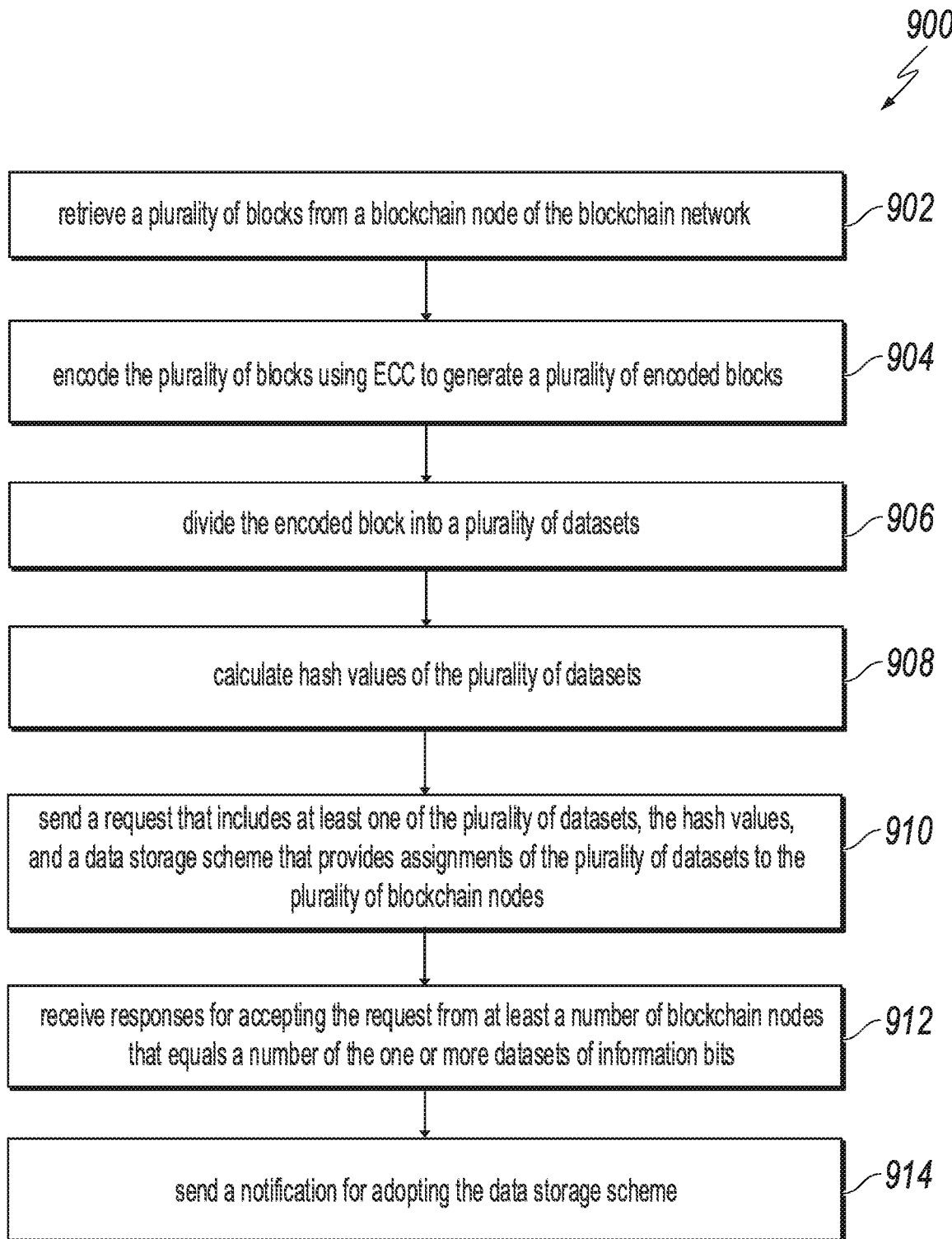
FIG. 9 depicts an example of a process that can be executed in accordance with embodiments of this specification.

FIG. 9 depicts an example of a process 900 that can be executed in accordance with embodiments of this specification. For convenience, the process 900 will be described as being performed in a TEE of a computing device or a system of one or more computers, located in one or more locations, and programmed appropriately in accordance with this specification. For example, a computing device in a computing system, e.g., the computing system 106, 108 of FIG. 1, appropriately programmed, can perform the process 900.

At 902, the computing device retrieves a plurality of blocks from a blockchain node of the blockchain network. In some cases, the retrieving the plurality of blocks is performed in response to a blockchain node dropping out from the blockchain network.

At 904, the computing device encodes the plurality of blocks using ECC to generate a plurality of encoded block. In some cases, a number of the plurality of datasets equals a number of blockchain nodes of the blockchain network and a code rate of the plurality of encoded blocks equals a minimum number of honest blockchain nodes required by the blockchain network divided by a total number of blockchain nodes.

In some cases, for each block of the plurality of blocks after the blockchain node drops out, the computing device further determines a first number of blockchain nodes that stores at least a portion of an ECC encoded version of the block and a second number of blockchain nodes that store at least a portion of redundant bits of the ECC encoded version of the block, a total number of blockchain nodes of the blockchain network and a maximum number of faulty blockchain nodes tolerable by the blockchain network, and whether a first difference between the first number and the second number is less than or equal to a second difference between the total number and the maximum number.

In some cases, the ECC is performed when utilization rate of computational resource of the computing device is less than or equal to a predetermined value. In some cases, the ECC is erasure coding performed by adding redundant bits to the plurality of blocks.

At 906, for each of the plurality of blocks, the computing device divides the encoded block into a plurality of datasets, wherein the plurality of datasets include one or more datasets of information bits and one or more datasets of redundant bits. In some cases, the minimum number of honest blockchain nodes required is determined based on the PBFT consensus protocol.

At 908, the computing device calculates hash values of the plurality of datasets. At 910, the computing device sends, to each of a plurality of blockchain nodes of the blockchain network, a request that includes at least one of the plurality of datasets, the hash values, and a data storage scheme that provides assignments of the plurality of datasets to the plurality of blockchain nodes.

At 912, the computing device receives responses for accepting the request from at least a number of blockchain nodes that equals a number of the one or more datasets of information bits. At 914, the computing device sends, to each of the plurality of blockchain nodes, a notification for adopting the data storage scheme. In some cases, the adopting the data storage scheme further includes: storing at least one of the plurality of datasets based on the assignments provided in the data storage scheme, and deleting existing blockchain data associated with the plurality of blocks.

Figure 10:
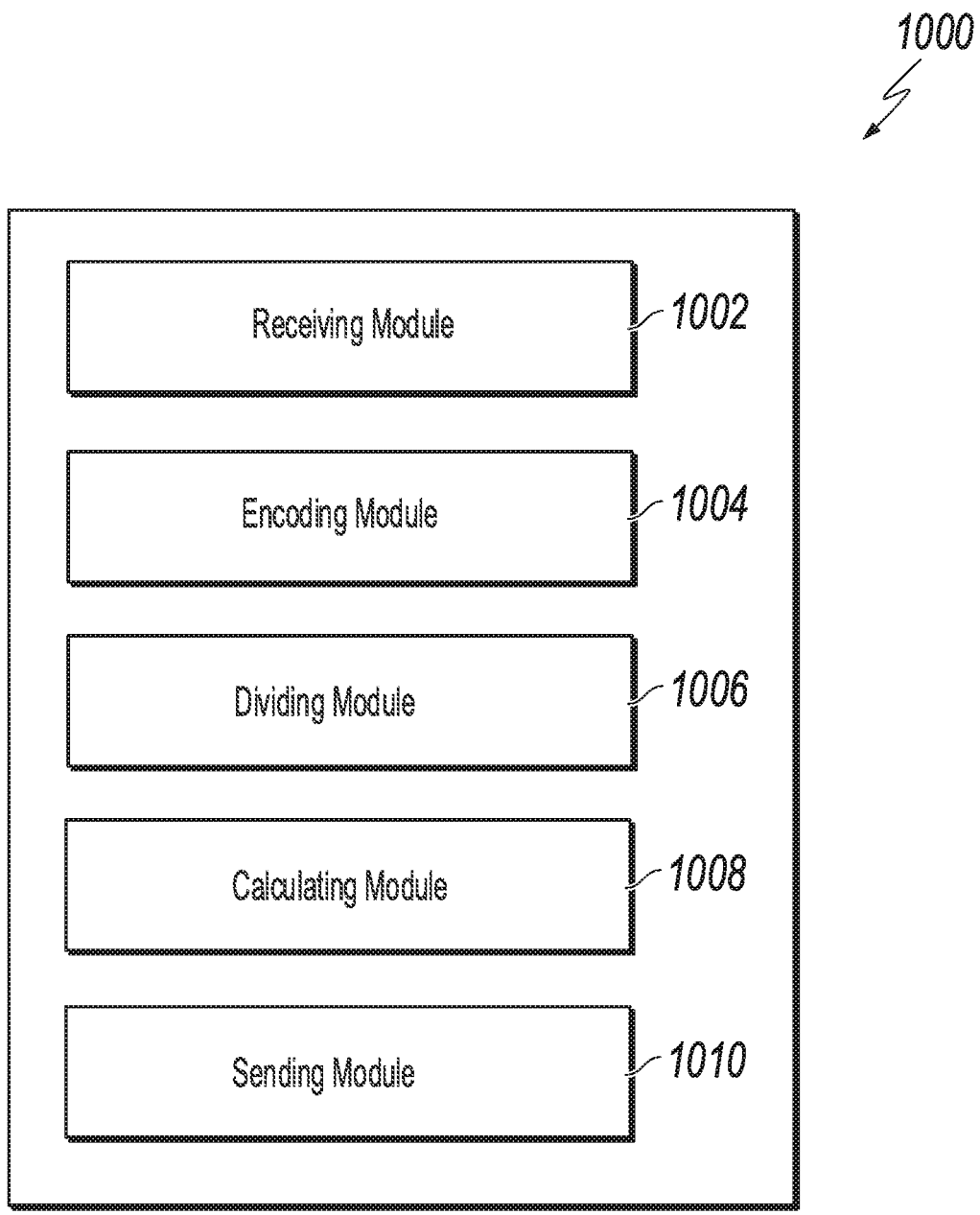
FIG. 10 depicts examples of modules of an apparatus in accordance with embodiments of this specification.

FIG. 10 is a diagram of an example of modules of an apparatus 1000 in accordance with embodiments of this specification. The apparatus 1000 can be an example of an embodiment of a computing device hosting a TEE configured to process blockchain data. The apparatus 1000 can correspond to the embodiments described above, and the apparatus 1000 includes the following: a retrieving module 1002 that retrieves a plurality of blocks from a blockchain node of the blockchain network; an encoding module 1004 that encodes the plurality of blocks using ECC to generate a plurality of encoded blocks; a dividing module 1006 that divides the encoded block into a plurality of datasets, wherein the plurality of datasets include one or more datasets of information bits and one or more datasets of redundant bits; a calculating module 1008 that calculates hash values of the plurality of datasets; a sending module 1010 that sends to each of a plurality of blockchain nodes of the blockchain network, a request that includes at least one of the plurality of datasets, the hash values, and a data storage scheme that provides assignments of the plurality of datasets to the plurality of blockchain nodes; the receiving module 1002 that receives responses for accepting the request from at least a number of blockchain nodes that equals a number of the one or more datasets of information bits; and the sending module 1010 that sends, to each of the plurality of blockchain nodes, a notification for adopting the data storage scheme.

In some embodiments, the adopting the data storage scheme further includes: storing at least one of the plurality of datasets based on the assignments provided in the data storage scheme; and deleting existing blockchain data associated with the plurality of blocks.

In some embodiments, a number of the plurality of datasets equals a number of blockchain nodes of the blockchain network and a code rate of the plurality of encoded blocks equals a minimum number of honest blockchain nodes required by the blockchain network divided by a total number of blockchain nodes. The number of the one or more datasets of information bits equals the number of the minimum number of honest blockchain nodes required by the blockchain network.

In some embodiments, the retrieving the plurality of blocks is performed in response to a blockchain node dropping out from the blockchain network.

In some embodiments, the apparatus 1000 further comprising a determining submodule that determines a first number of blockchain nodes that stores at least a portion of an ECC encoded version of the block and a second number of blockchain nodes that store at least a portion of redundant bits of the ECC encoded version of the block, a total number of blockchain nodes of the blockchain network and a maximum number of faulty blockchain nodes tolerable by the blockchain network, and whether a first difference between the first number and the second number is less than or equal to a second difference between the total number and the maximum number.

In some embodiments, the encoding the plurality of blocks is performed in response to determining that the first difference is less than or equal to the second difference.

In some embodiments, the ECC is performed when utilization rate of computational resource of the computing device is less than or equal to a predetermined value.

In some embodiments, the ECC is erasure coding performed by adding redundant bits to the plurality of blocks.

In some embodiments, the minimum number of honest blockchain nodes required is determined based on a PBFT consensus protocol.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 10, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for processing blockchain data on a computing device communicably coupled to a blockchain network, the method comprising:
  retrieving a plurality of blocks from a blockchain node of the blockchain network;
  encoding the plurality of blocks using error correction coding (ECC) to generate a plurality of encoded blocks; and
  for each encoded block in the plurality of encoded blocks:
    dividing the encoded block into a plurality of datasets, wherein the plurality of datasets include one or more datasets of information bits and one or more datasets of redundant bits;
    calculating hash values of the plurality of datasets;
    sending, to each of a plurality of blockchain nodes of the blockchain network, a request that includes at least one of the plurality of datasets, the hash values, and a data storage scheme that provides assignments of the plurality of datasets to the plurality of blockchain nodes;

receiving responses for accepting the request from at least a number of blockchain nodes that equals a number of the one or more datasets of information bits; and sending, to each of the plurality of blockchain nodes, a notification for adopting the data storage scheme.

2. The computer-implemented method of claim 1, wherein the adopting the data storage scheme further includes:

storing at least one of the plurality of datasets based on the assignments provided in the data storage scheme; and deleting existing blockchain data associated with the plurality of blocks.

3. The computer-implemented method of claim 1, wherein a number of the plurality of datasets equals a number of blockchain nodes of the blockchain network and a code rate of the plurality of encoded blocks equals a minimum number of honest blockchain nodes required by the blockchain network divided by a total number of blockchain nodes.

4. The computer-implemented method of claim 1, wherein the retrieving the plurality of blocks is performed in response to a blockchain node dropping out from the blockchain network.

5. The computer-implemented method of claim 4, the method further comprising:

for each block of the plurality of blocks after the blockchain node dropping out:

determining a first number of blockchain nodes that stores at least a portion of an ECC encoded version of the block and a second number of blockchain nodes that store at least a portion of redundant bits of the ECC encoded version of the block;

determining a total number of blockchain nodes of the blockchain network and a maximum number of faulty blockchain nodes tolerable by the blockchain network; and determining whether a first difference between the first number and the second number is less than or equal to a second difference between the total number and the maximum number.

6. The computer-implemented method of claim 5, wherein the encoding the plurality of blocks is performed in response to determining that the first difference is greater than the second difference.

7. The computer-implemented method of claim 1, wherein the ECC is performed when utilization rate of computational resource of the computing device is less than or equal to a predetermined value.

8. The computer-implemented method of claim 1, wherein the ECC is erasure coding performed by adding redundant bits to the plurality of blocks.

9. The computer-implemented method of claim 1, wherein a minimum number of honest blockchain nodes required is determined based on a practical Byzantine fault tolerance (PBFT) consensus protocol.

10. A non-transitory, computer-readable medium storing one or more instructions executable by a computer device to perform operations for processing blockchain data, the operations comprising:

retrieving a plurality of blocks from a blockchain node of a blockchain network;

encoding the plurality of blocks using error correction coding (ECC) to generate a plurality of encoded blocks; and for each encoded block in the plurality of encoded blocks:

dividing the encoded block into a plurality of datasets, wherein the plurality of datasets include one or more datasets of information bits and one or more datasets of redundant bits;

calculating hash values of the plurality of datasets;

sending, to each of a plurality of blockchain nodes of the blockchain network, a request that includes at least one of the plurality of datasets, the hash values, and a data storage scheme that provides assignments of the plurality of datasets to the plurality of blockchain nodes;

receiving responses for accepting the request from at least a number of blockchain nodes that equals a number of the one or more datasets of information bits; and sending, to each of the plurality of blockchain nodes, a notification for adopting the data storage scheme.

11. The non-transitory, computer-readable medium of claim 10, wherein the adopting the data storage scheme further includes:

storing at least one of the plurality of datasets based on the assignments provided in the data storage scheme; and deleting existing blockchain data associated with the plurality of blocks.

12. The non-transitory, computer-readable medium of claim 10, wherein a number of the plurality of datasets equals a number of blockchain nodes of the blockchain network and a code rate of the plurality of encoded blocks equals a minimum number of honest blockchain nodes required by the blockchain network divided by a total number of blockchain nodes.

13. The non-transitory, computer-readable medium of claim 10, wherein the retrieving the plurality of blocks is performed in response to a blockchain node dropping out from the blockchain network.

14. The non-transitory, computer-readable medium of claim 13, the operations further comprising:

for each block of the plurality of blocks after the blockchain node dropping out:

determining a first number of blockchain nodes that stores at least a portion of an ECC encoded version of the block and a second number of blockchain nodes that store at least a portion of redundant bits of the ECC encoded version of the block;

determining a total number of blockchain nodes of the blockchain network and a maximum number of faulty blockchain nodes tolerable by the blockchain network; and determining whether a first difference between the first number and the second number is less than or equal to a second difference between the total number and the maximum number.

15. The non-transitory, computer-readable medium of claim 14, wherein the encoding the plurality of blocks is performed in response to determining that the first difference is greater than the second difference.

16. The non-transitory, computer-readable medium of claim 10, wherein the ECC is performed when utilization rate of computational resource of the computing device is less than or equal to a predetermined value.

17. The non-transitory, computer-readable medium of claim 10, wherein the ECC is erasure coding performed by adding redundant bits to the plurality of blocks.

18. The non-transitory, computer-readable medium of claim 10, wherein a minimum number of honest blockchain nodes required is determined based on a practical Byzantine fault tolerance (PBFT) consensus protocol.

19. A computer-implemented system for processing blockchain data, comprising:
 one or more computers; and
 one or more computer memory devices interoperably coupled with the one or more computers and having tangible, non-transitory, machine-readable media storing one or more instructions that, when executed by the one or more computers, perform one or more operations comprising:
  retrieving a plurality of blocks from a blockchain node of a blockchain network;
  encoding the plurality of blocks using error correction coding (ECC) to generate a plurality of encoded blocks; and
  for each encoded block in the plurality of encoded blocks:
   dividing the encoded block into a plurality of datasets, wherein the plurality of datasets include one or more datasets of information bits and one or more datasets of redundant bits;
   calculating hash values of the plurality of datasets;
   sending, to each of a plurality of blockchain nodes of the blockchain network, a request that includes at least one of the plurality of datasets, the hash values, and a data storage scheme that provides assignments of the plurality of datasets to the plurality of blockchain nodes;
   receiving responses for accepting the request from at least a number of blockchain nodes that equals a number of the one or more datasets of information bits; and
   sending, to each of the plurality of blockchain nodes, a notification for adopting the data storage scheme.

20. The computer-implemented system of claim 19, wherein the adopting the data storage scheme further includes:
 storing at least one of the plurality of datasets based on the assignments provided in the data storage scheme; and
 deleting existing blockchain data associated with the plurality of blocks.

21. The computer-implemented system of claim 19, wherein a number of the plurality of datasets equals a number of blockchain nodes of the blockchain network and a code rate of the plurality of encoded blocks equals a minimum number of honest blockchain nodes required by the blockchain network divided by a total number of blockchain nodes.

22. The computer-implemented system of claim 19, wherein the retrieving the plurality of blocks is performed in response to a blockchain node dropping out from the blockchain network.

23. The computer-implemented system of claim 22, the operations further comprising:
 for each block of the plurality of blocks after the blockchain node dropping out:
  determining a first number of blockchain nodes that stores at least a portion of an ECC encoded version of the block and a second number of blockchain nodes that store at least a portion of redundant bits of the ECC encoded version of the block;
  determining a total number of blockchain nodes of the blockchain network and a maximum number of faulty blockchain nodes tolerable by the blockchain network; and
  determining whether a first difference between the first number and the second number is less than or equal to a second difference between the total number and the maximum number.

24. The computer-implemented system of claim 23, wherein the encoding the plurality of blocks is performed in response to determining that the first difference is greater than the second difference.

25. The computer-implemented system of claim 19, wherein the ECC is performed when utilization rate of computational resource of the one or more computers is less than or equal to a predetermined value.

26. The computer-implemented system of claim 19, wherein the ECC is erasure coding performed by adding redundant bits to the plurality of blocks.

27. The computer-implemented system of claim 19, wherein a minimum number of honest blockchain nodes required is determined based on a practical Byzantine fault tolerance (PBFT) consensus protocol.

* * * * *